Oct. 19, 1965  M. BERGER  3,213,396
FLUX BARRIER DEVICE
Filed May 1, 1962  2 Sheets-Sheet 1

INVENTOR.
MARTIN BERGER
BY
Leonard H. King
ATTORNEY.

Oct. 19, 1965  M. BERGER  3,213,396

FLUX BARRIER DEVICE

Filed May 1, 1962  2 Sheets-Sheet 2

INVENTOR.
MARTIN BERGER
BY
Leonard H. King
ATTORNEY.

United States Patent Office 3,213,396
Patented Oct. 19, 1965

3,213,396
FLUX BARRIER DEVICE
Martin Berger, North Arlington, N.J., assignor to
Avien, Inc., Woodside, N.Y.
Filed May 1, 1962, Ser. No. 191,500
6 Claims. (Cl. 336—30)

The present application relates to measuring devices wherein an electrical signal is derived by the displacement of a movable member in the air gap of a magnetizable structure, the alternation of electrical signal in the structure being a function of the extent of the movement. More particularly, the present invention relates to means for imparting a very high order of linearity in the ratio of movement of the displaceable member to alteration of the signal, whereby greatly improved accuracy in measurement of minute changes in position may be accomplished.

In a large variety of control systems, it is necessary to convert a small change in physical position to a corresponding electrical signal, which is then amplified and used for measurement or for actuating appropriate follow-up and control devices. A highly useful device for obtaining an electrical output from such change in position is the "flux barrier" type of transformer, wherein a magnetizable core member is provided with an air gap, and the flux barrier, a non-magnetizable element, is displaced within this air gap to thereby alter the flowpath of flux induced in the core. This alteration is conventionally measured by the differential readings of voltage output present in the branches of a shunt circuit, which determines which branch has the greater amount of magnetic flux present.

The present state of the art is sufficiently advanced so that minute changes in flux intensity and divergence in flow path can be detected and greatly amplified by electronic means well known in the art. It will therefore be appreciated that the problem in such devices is no longer sensitivity, per se, but rather, linearity in the correlation of movement of the flux barrier in the air gap with the tiny variations in flux intensity resulting therefrom. That is, while the unbalance signal can be derived and amplified by conventional means, there exists the problem of far greater refinement in the linearity characteristic of such measurement.

This becomes of increasing importance with the ever growing miniaturization of parts and refinement of manufacturing techniques, with corresponding need to measure ever smaller quantities. Therefore, in devices of this type it has become necessary to incorporate compensating means to make certain that the movement of the flux bar results in a linear characteristic, especially over small distances, as where the movable member is responsive to movement of sensitive pressure devices, Bourdon tubes, strain gages, or the like. These problems are inevitable in the present state of the art, since the physical construction of the device makes linearity difficult to achieve. Presently, it is preferred to make the core structure of thin laminations of ferromagnetic material, as is well known in the art, rather than of a single block of metal. Thus, in assembling or machining the opposing faces of the air gap, it becomes virtually impossible to obtain the necessary parallel relationship, therefore the air gap will not be uniform. In such case, the flux distribution will have a corresponding unbalance. In addition, factors such as aging, temperature, and continual handling of the device, can cause similar alteration in dimensions of the structure, causing further unbalance to build up in the device. Thus, the problem of the compensation for non-linearity arises not only at the time of the original manufacture and factory adjustment of the device, but after continual use. It will be appreciated that it is highly desirable that provision for compensation and adjustment of the linearity characteristic exist in the device at all times.

It is therefore a primary object of the present invention to provide a position measuring device characterized by a very high linearity ratio between change in position and electrical signal responsive to such change.

It is a further object of the present invention to provide an improved electromechanical transducer of the flux barrier type, characterized by high resolution consonant with simplicity of construction.

Yet a further object of the present invention is the provision of novel compensation means for a flux barrier device.

It is still a further object of the present invention to provide means for selectably adjusting the ratio of physical displacement of the flux barrier to a desired output voltage, whereby specific non-linear functions may be set up.

These and other objects and advantages of the present invention will be set forth in further detail or will become apparent from the following description in conjunction with the accompanying drawings in which.

Figure 1:
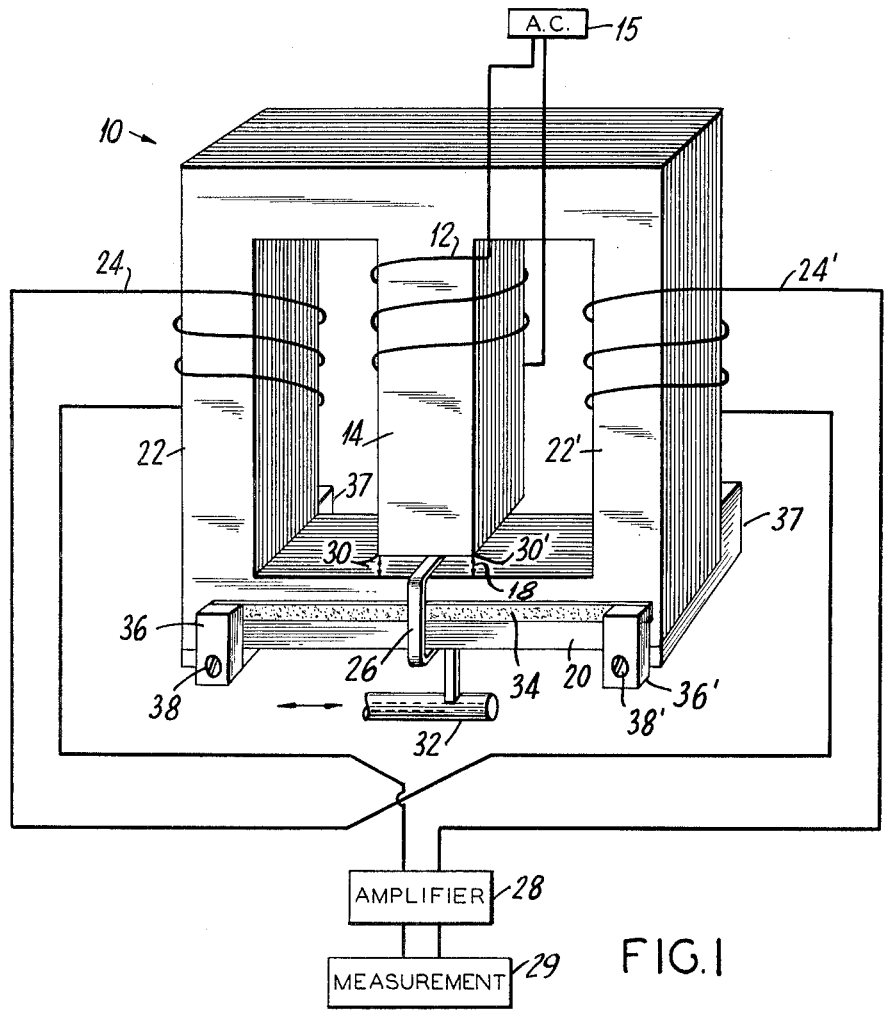
FIG. 1 is a diagrammatic perspective view of an embodiment of the device of the present invention.

Referring more specifically to the drawings, there is shown in FIG. 1 a simplified view of a flux barrier device embodying the novel features of the present invention. The device, characterized generally by the numeral 10, is a ferromagnetic structure formed of thin laminations of magnetizable material, as indicated in the drawing. These layers are bonded together as is well known in the art, the structure of such core material enabling the device to retain a high degree of magnetic flux from coil 12 coupled to central core member 14 and connected to a source of alternating current 16. An air gap 18 of relatively narrow width separates central core 14 from the base portion 20 of the device. Shunt arms 22–22' are joined at the base 20 and also form a common connection with central core member 14 at the upper portion of the device. Since air gap 18 is of small dimension, it will be appreciated that magnetic flux generated in core member 14 by alternating current source 15 will readily travel across this gap upon energization of the coil, with consequent induction of magnetic flux into shunt arms 22–22'. Output coils 24–24' are coupled to the respective shunt arms, whereby the alternating magnetomotive force of this flux induces an output voltage into coils 24–24'. In the embodiment of FIG. 1, the coils are shown wound in series opposing relationship, and are arranged so that in a state of balance, the voltage at each moment is equal and opposite, hence these voltages cancel out. However, a flux barrier 26 positioned in the air gap is formed of an electrically conductive material, such as copper, brass, or the like, altering the path of flux flow through the air gap depending on the position of this flux barrier. This takes place due to the fact that the alternating flux induces a current in the flux barrier. This current is constantly changing, hence gives rise to a secondary flux, which opposes the primary flux, thus acting as a flux barrier. Thus any displacement of the flux barrier from the position of equilibrium (which theoretically should be at the center point of the air gap), causes an unequal distribution of flux in the shunt arms, hence one or the other will show a higher voltage. Amplifier 28 and measurement device 29 indicate the amplitude and phase of the larger voltage.

If the device is preferably linear, it will be evident that translatory motion of flux barrier 26 from one side of the air gap to the other, herein indicating as points 30–30′, will be accompanied by a corresponding change in voltage output as a linear function of this displacement. Hence such voltage should give an exact measurement of the position of the flux barrier in terms of the phase and amplitude of such voltage. Thus, where the flux barrier is displaceable by a control device, herein indicated schematically by longitudinally moving member 32, then at each moment the output of the device would give an accurate representation of the position of this moving element with reference to a set point. It will be understood that member 32 represents the movable portion of a rectilinear transducer control device such as strain gauge, Bourdon tube, or the like.

Figure 3:
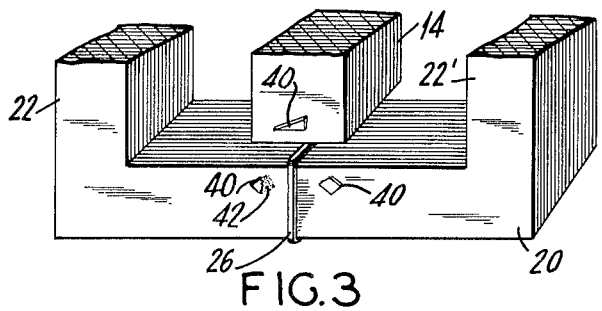
FIG. 3 is a perspective view of an alternative embodiment of the device of the present invention.
Figure 4:
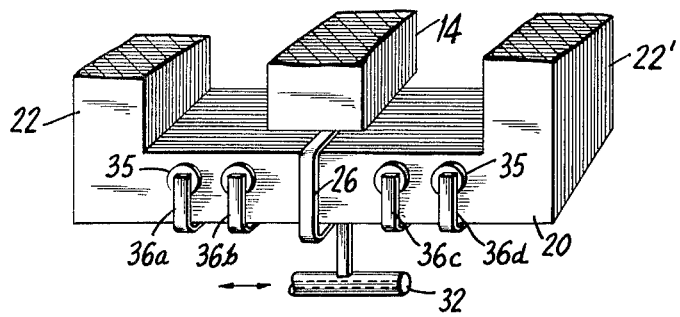
FIG. 4 is a perspective view of a portion of the device, showing an alternative embodiment of the present invention.

However, it will be apparent that the construction of the flux barrier device presents inherent causes for non-linearity. The necessity for a laminated structure causes a ridge-like configuration to the confronting faces of the air gap, as indicated in FIG. 1. Thus, perfectly parallel surfaces and a uniform gap cannot be manufactured. Furthermore, aging of the unit, temperature differences, and normal use in handling of the device will cause some physical change in the dimensions of the laminations which even though minute, will cause an alteration in the flux distribution. At present, the only solution is laborious and expensive machining of the laminations facing the air gap, with the possibility that this will have to be repeated should errors develop. The device of the present invention proposes to obviate this by a compensation device for the lamination structure proximate to the air gap, which will have the effect of compensating for the non-uniform flux density across the gap and thus eliminate the linearity error in the output voltage. As shown in FIG. 1, lamination 34 is secured to the device by clamps 36–36′ which also secure the core structure of the device to a mounting plate 37, by means of screws 38–38′. Proper adjustment in spacing can be effected by loosening screws 38–38′. This lamination effectively manipulates the "fringing flux" in base 20, in a manner which compensates for the variation in the main flux across the air gap. While the positioning of the lamination is shown in a typical form in the drawing, it will be appreciated that a relatively minor adjustment will have an appreciable effect on linearity, thus permitting of accurate compensation. Lamination 34 is formed of ferromagnetic material, and is conveniently retained in place by clamps 36–36′ provided with retaining screws 38–38′, whereby the laminations can be moved about as desired, then clamped securely in position. If desired, more than one lamination can be used, with several laminations arranged to provide the required linearity compensation, then clamped in place as described hereinabove. Alternatively, a small piece of metal, say 0.02 square inch, comprising a magnetically conductive lamination 40, can be employed. This lamination 40 is retained in place by adhesive 42 (FIG. 3). These laminations may be disposed on different portions of base 20 or central core 14, proximate to the air gap. As shown in FIG. 4, base 20 of the device can serve as a mounting for a group of individual clamps, 36a, 36b, etc., in each of which a magnetically conductive lamination 35 may be releasably disposed, as desired. This provides for a far more precise control of the flux distribution, hence a higher degree of linearity is attained as flux barrier 26 is moved through the air gap. Alternatively, this arrangement can provide a non-linear output, where desired.

Figure 2:
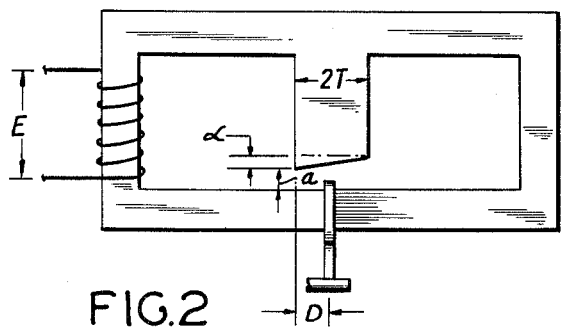
FIG. 2 is a diagrammatic representation of a non-parallel air gap, to illustrate the degree of error induced.

It can be shown that if the air gap faces in a flux barrier device are not parallel, the linearity error that appears in the output voltage is approximately one-quarter of the mechanical variation of the air gap length. Thus in FIG. 2, where $\alpha$ is the amount of divergence from the parallel of the opposing faces, and $a$ is the width of the air gap, then the magnitude of error, namely, the deviation of the observed voltage from the true voltage, may be shown to be $$D=\frac{1}{4}\left(\frac{\alpha}{a}\right)$$

It will be appreciated that elimination of this error will greatly enhance the utility of such a device.

It will be appreciated by those familiar with the art that flux barrier devices may be employed both in the potentiometer mode, whereby coils in the shunt arms are connected in series aiding, or the flux barrier transducer may be used in the differential mode with the connections in series opposing. It will also be appreciated that various forms of movable lamination members corresponding to member 34 can be employed, whereby a selectable non-linear characteristic may be obtained. That is, instead of lamination 34 being used to improve the linearity of the device, it may be positioned so as to provide a non-linear characteristic in certain applications. Similarly, the dot laminations of FIG. 4 can be arranged to provide a non-linear output.

Figure 5:
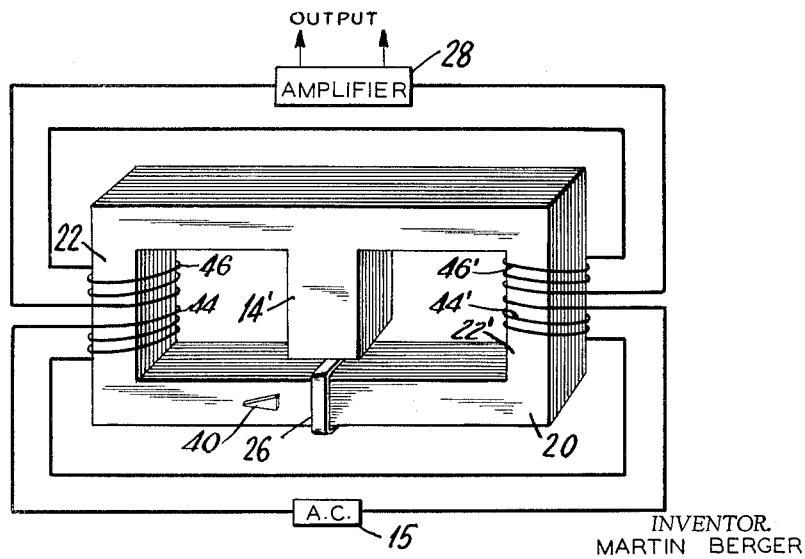
FIG. 5 is an alternative diagrammatic perspective view of the present invention.

An alternate method of winding the coils on the device of the present invention is shown in FIG. 5, wherein the input winding 44–44′ is disposed in both arms 22–22′. The central member 14′ has no coil winding. It will be noted that the close coupling between input and output coils results in maximum transference of signal to the output coil 46–46′.

Other changes and modifications may be employed by those skilled in the art without, however, departing from the envisaged scope of the invention.

What is claimed is:

1. In a position-responsive apparatus comprising, in combination; a magnetic core structure forming first and second magnetic paths and having a portion common to both of said paths, said structure including elongated base and top members joined at the ends thereof by a pair of outer legs, said structure also having a central leg fixedly positioned relative to said members and extending between said top member and said base member to form the said common core portion for said two magnetic circuits, air-gap means in said magnetic structure and arranged to couple said central leg to said two outer legs, said air-gap means comprising an interruption in said central leg, a movable flux barrier comprising a closed loop of non-magnetic electrically-conductive material positioned to extend into said air-gap means and to move therealong to vary the relative magnetic coupling between said central leg and said outer legs respectively, a primary winding wound on said central leg, a pair of secondary windings wound on said magnetic structure and inductively coupled respectively to said first and second magnetic circuits in regions thereof remote from said central leg, and an output circuit connected to said secondary windings; the improvement comprising:

a magnetizable lamination member secured to said magnetic core structure proximate to said air-gap means, said lamination member being substantially smaller in cross section than said core structure.

2. A device as in claim 1 including clamping means arranged to releasably retain said lamination member against said core structure proximate to said air-gap means.

3. The device of claim 1 including an adhesive securing said lamination to said structure.

4. In a position-responsive apparatus comprising, in combination; a magnetic core structure forming first and second magnetic paths and having a portion common to both of said paths, said structure including elongated base and top members joined at the ends thereof by a pair of outer legs, said structure also having a central leg fixedly positioned relative to said members and extending between said top member and said base member to form the said common core portion for said two magnetic circuits, air-gap means in said magnetic structure and arranged to couple said central leg to said two outer legs, said air-gap means comprising an interruption in said central leg, a movable flux barrier comprising a closed loop of non-magnetic electrically-conductive material positioned to extend into said air-gap means and to move therealong to vary the relative magnetic coupling between said central leg and said outer legs respectively, a primary winding wound on said central leg, a pair of secondary windings wound on said magnetic structure and inductively coupled respectively to said first and second magnetic circuits in regions thereof remote from said central leg, and an output circuit connected to said secondary windings; the improvement comprising:

a plurality of magnetizable lamination members, each of which is smaller than said air-gap means, fixed to said magnetic core structure proximate said air-gap means.

5. The device of claim 4 including adhesive portions securing said laminations to said structure.

6. The device of claim 4 including clamping means arranged to releasably retain said lamination members to said core structure proximate to said air-gap means.

References Cited by the Examiner

UNITED STATES PATENTS

| 2,943,285 | 6/60 | Smith | 336—75 |
| 2,981,909 | 4/61 | Smith | 336—75 X |

JOHN F. BURNS, *Primary Examiner.*

DARRELL L. CLAY, *Examiner.*